April 25, 1944.  E. J. KRAVICK  2,347,418
POULTRY FEEDER
Filed June 22, 1943  2 Sheets-Sheet 1
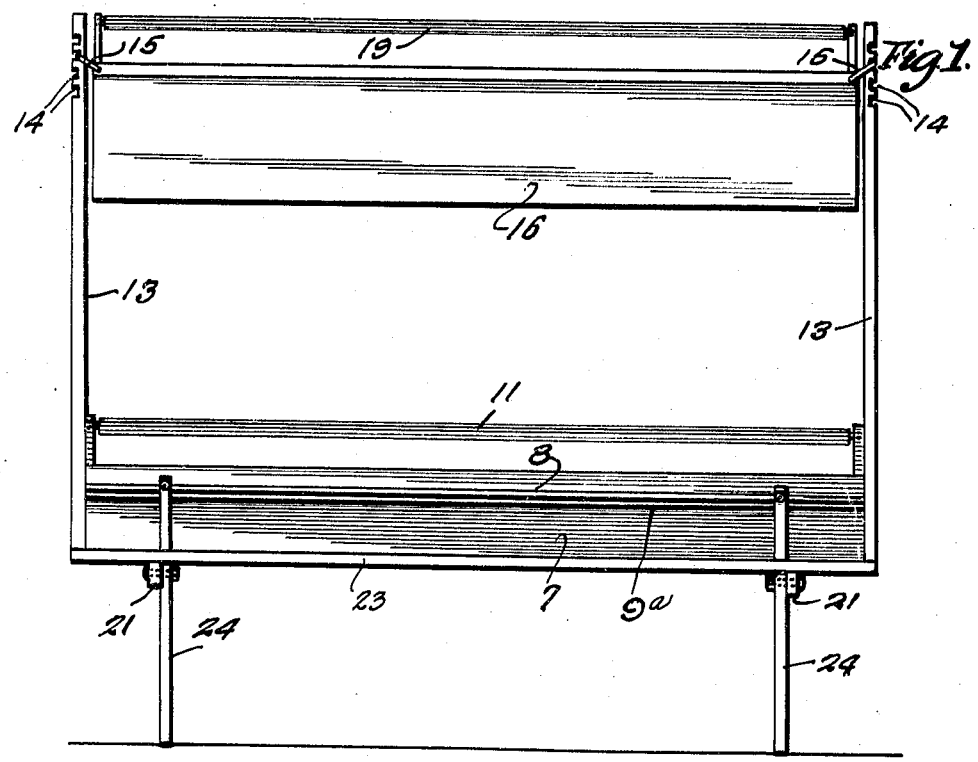
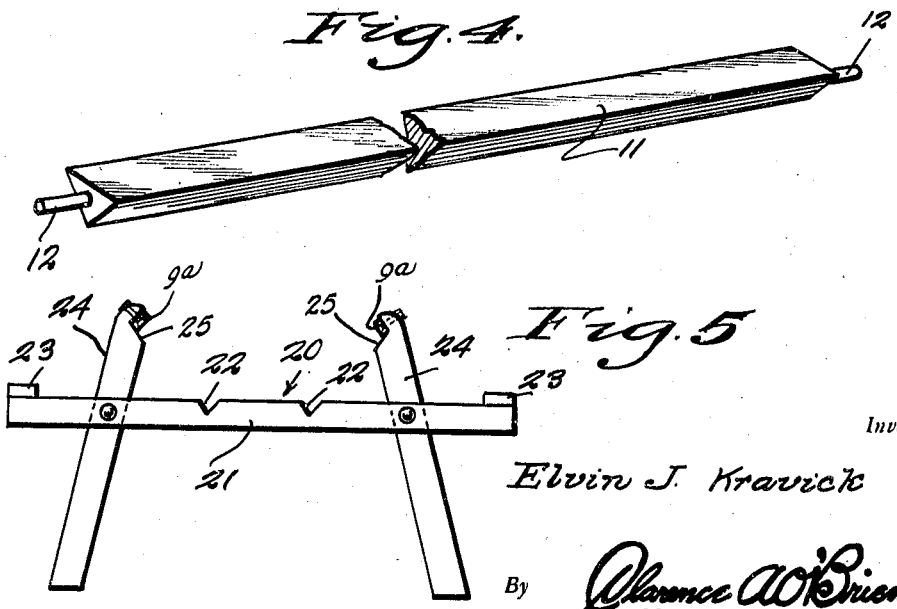
Inventor
Elvin J. Kravick
By Clarence A. O'Brien
and Harvey B. Jackson
Attorneys April 25, 1944.   E. J. KRAVICK   2,347,418
POULTRY FEEDER
Filed June 22, 1943   2 Sheets-Sheet 2
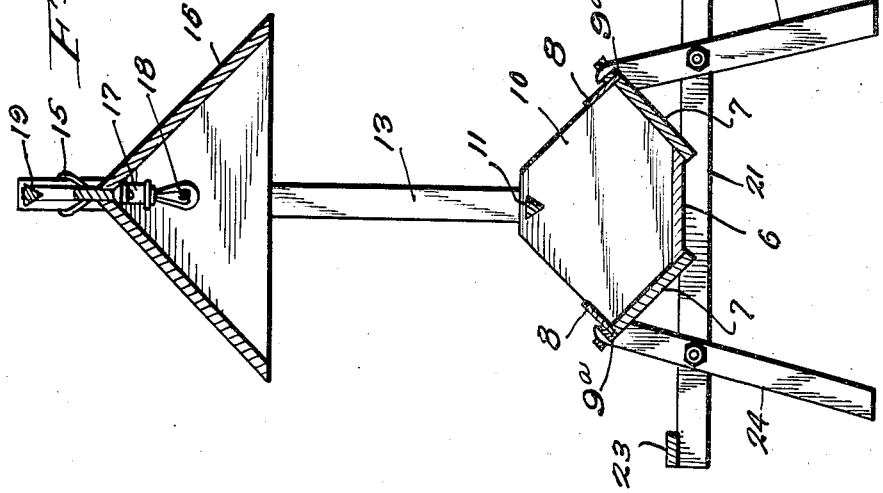
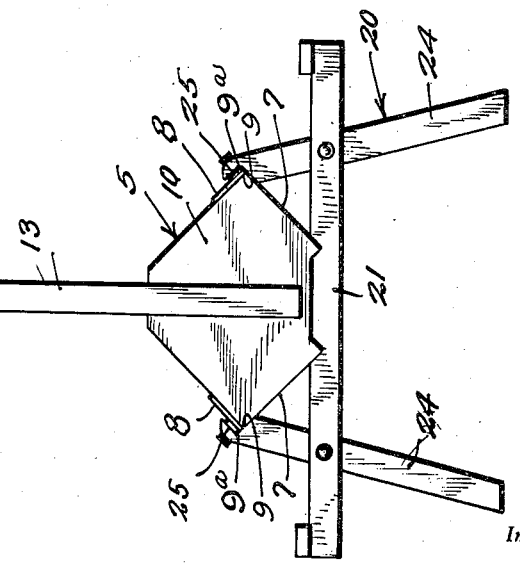
Inventor
Elvin J. Kravick
By Clarence A. O'Brien
and Harvey B. Jacobson
Attorneys Patented Apr. 25, 1944

2,347,418

UNITED STATES PATENT OFFICE 2,347,418

POULTRY FEEDER

Elvin J. Kravick, Stoughton, Wis.

Application June 22, 1943, Serial No. 491,816

1 Claim. (Cl. 119—61)

This invention relates to new and useful improvements in poultry feeders adapted for containing either water or feed.

An important object of the invention is to provide a feeder or waterer wherein the contents of the device will be kept from freezing in low temperature weather by the provision of illuminating means which also offers a certain amount of heat radiation.

Another important object of the invention is to provide a feeder of the character stated which can be converted into several different types, such as a floor type, stand type or range type.

Other objects and advantages of the invention will become apparent to the reader of the following description.

In the drawings:

Figure 1 represents a side elevational view.

Figure 2 is an end elevational view.

Figure 3 is an intermediate vertical sectional view.

Figure 4 is a fragmentary perspective view of the separating bar.

Figure 5 is an end elevational view of the stand.

Referring to the drawings wherein like numerals designate like parts, it can be seen that numeral 5 denotes a trough structure which consists of a bottom 6, sloping side walls 7, 7, short inwardly sloping upper walls 8, 8, defining corners 9, 9 and end walls 10, 10 bridged by a separating bar 11, preferably of triangular cross section having end pintles 12, 12 disposed into openings in the end walls 10, 10. The bar 11 bridges the upper portion of the end walls 10.

Rising from each end wall 10 is a post 13 which at its outer upper side portion is formed with notches 14 which can be engaged by loops 15 at the ends of a hood 16 in which electric light sockets 17 are secured and adapted to hold electric light bulbs 18 or any desired source of light, for not only furnishing illumination but also a certain amount of heat to prevent freezing of the contents of the trough 5.

A spindle 19 bridges the upper ends of the hood 16 and rotates when a fowl attempts to roost thereon. Obviously, the hood 16 can be adjusted vertically as seen fit.

Numeral 20 denotes a stand and this consists of horizontal end members 21 each having a pair of notches 22 at the intermediate portion thereof for receiving the lower edge portions of sloping walls 27, 27. The ends of the end members 21 are bridged by bars 23, 23 upon which fowl can perch.

Each end member 21 has a pair of pivotal legs 24, 24 inwardly of the perch bars 23 and each of these legs has a notched upper end 25. The notched portions of the legs are bridged at each side of the frame 20 by a strip 9a for embracing the corner portions 9, 9 of the trough 5 as shown in Figure 3.

Obviously, the stand 20 can be easily removed whenever desired in order that the feeder may be used as any floor type feeder would ordinarily be used.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a feeder of the class described, a flat bottom trough having sides with diverging upper and lower edges and extending below said bottom, and a stand comprising a pair of horizontal end members upon which said bottom rests, said members being provided with upper edge notches interfitting with that portion of the lower edges which extends below said bottom, a pair of fowl perch bars bridging said members, and end pairs of legs pivoted to said members and provided with notched upper ends fitting over said side edges.

ELVIN J. KRAVICK.